REGISTRY CIRCUITS FOR REMOTE CONTROL SYSTEMS

Filed Oct. 20, 1959 3 Sheets-Sheet 1

INVENTORS.
Stanley Leonard Hurst and
John Joseph Ring
BY W. L. Stout
THEIR ATTORNEY

REGISTRY CIRCUITS FOR REMOTE CONTROL SYSTEMS

Filed Oct. 20, 1959 3 Sheets-Sheet 2

Feb. 7, 1961 S. L. HURST ET AL 2,971,100

REGISTRY CIRCUITS FOR REMOTE CONTROL SYSTEMS

Filed Oct. 20, 1959 3 Sheets-Sheet 3

INVENTORS.
Stanley Leonard Hurst and
John Joseph Ring
BY
W. L. Stout.
THEIR ATTORNEY United States Patent Office 2,971,100

Patented Feb. 7, 1961

2,971,100

REGISTRY CIRCUITS FOR REMOTE CONTROL SYSTEMS

Stanley Leonard Hurst and John Joseph Ring, London, England, assignors to Westinghouse Brake and Signal Company Limited, London, England Filed Oct. 20, 1959, Ser. No. 847,626

Claims priority, application Great Britain Oct. 29, 1958

13 Claims. (Cl. 307—88.5)

Our invention relates to registry circuits for remote control systems. More particularly, our invention relates to function registry circuits for continuously scanning, electronic remote control systems.

Electronic remote control systems are well known in the signaling art, both as to vacuum tube and transistorized types. For example, a transistorized remote control system illustrating the type herein considered is disclosed in the copending application for Letters Patent of the United States, Serial No. 710,718, filed January 23, 1958, by B. H. Grose and S. L. Hurst, for Remote Control Systems. This prior system is of the continuously scanning type, transmitting controls from the office location and indications from the field location during each operating cycle. Such functions are transmitted in each direction by pulses of carrier current. A single function is transmitted in each direction during each counting or scanning step. In such systems, the use of carrier current pulses inherently entails at least some propagation or transmission channel delays. In this particular prior system, for example, these minor delays are overcome by having two bistable circuits for each counting chain stage. The operation of the second circuit of each stage is delayed to occur a short time after the operation of the corresponding first circuit, a single counting step comprising the operation of both circuits. Functions are transmitted simultaneously from the office and from the remote station during the operation of the first circuit of the then active stage at each location. Function registry, however, occurs during the operation of the second circuit at each location which provides the slight delay prior to function registry necessary to compensate for the transmission delay times of the carrier pulses. Thus, by utilizing two bistable circuit arrangements in each stage, the effect of the carrier transmission delay may be overcome, or at least minimized if not entirely eliminated. It is obvious that considerable advantage may be obtained if the second circuit arrangement can be eliminated from each counting chain stage while retaining the necessary delay compensation. Among other advantages, such an arrangement reduces the amount of material and expense required initially by the system and reduces the maintenance effort necessary to maintain its operation.

Accordingly, it is an object of our invention to provide an electronic remote control system of the continuously scanning type with only a single bistable circuit arrangement for each stage of the single counting chain at each location.

Another object of our invention is a function registry circuit arrangement for use with a single bistable circuit counting stage in electronic remote control systems.

It is also an object of our invention to provide function registry for electronic remote control systems which incorporates sufficient delay to overcome the pulse transmission delay times of the communication channel in use.

Still another object of our invention is a registry circuit arrangement in which the entire period of time between the stepping actions of a consecutive pair of counting chain stages may be utilized as necessary for the registry of the function associated with the first stage of the pair.

A further object of our invention is a remote control system utilizing a single bistable circuit for each counting stage and a registry circuit arrangement controlled to register functions only in the proper registry stage and incorporating a delay period to match the propagation delay time of the communication channel.

Other objects, features, and advantages of our invention will become apparent from the following specification when taken in connection with the accompanying drawings.

In practicing our invention, we provide a remote control system of the continuously scanning type with a single counting chain at each location comprising a single bistable circuit for each counting stage. Also provided is a series of similar bistable circuits at each location, one associated with each stage of the associated counting chain, for the purpose of registering the functions received at that location. The functions are received over the communication channel in use from a remote location as pulses of carrier current fed into a carrier current receiver, in any well known manner. One such carrier receiver is used for each frequency assigned to the transmission of functions into the location in question. It is here assumed that a negative output from the carrier receiver results when no carrier current of the assigned frequency is received. However, it is obvious that other arrangements may be used, particularly that in which the receiver provides a negative potential output when carrier current is received. The output of each receiver is connected in multiple to all of the registry stages at that location. As actually shown, each registry stage is capable of assuming a first or a second stable condition in accordance with receiver network output, which limits the number of carrier receivers to two. In other words, two frequencies are used to carry two-state functions. In addition to the multiple connection with the carrier receivers, each registry stage is connected with the counting chain stage with which it is directly associated through a variable impedance shunting arrangement, which may be comprised of half-wave rectifiers, transistors, or other well known elements. This registry stage is also connected through the variable impedance arrangement with the counting chain stage immediately following, in chain operation, the assigned or associated counting stage. Prior to initiation of the counting step to which the registry stage as well as its corresponding counting stage are assigned, the variable impedance network is so biased by the potential output of the associated counting stage that its impedance is sufficiently low to shunt both receiver outputs away from the registry stage during the preceding scanning steps. At the beginning of the assigned scanning step, the impedance of this network is shifted to a relatively high level to interrupt the shunt path and thus apply the receiver outputs to the registry stage for proper recording. At the beginning of the succeeding step and through the remaining steps of the scanning cycle, bias potential obtained from the next counting stage again lowers the impedance of the shunting network to the level at which the receiver output is shunted away from the reference registry stage, whose existing stable condition thus holds to record the function received during its assigned step. Each variable impedance network, there being one for each registry stage, thus conditions the associated registry stage for the recording of the proper function only during the counting step to which that registry stage is assigned.

To assure synchronization between the receiver output and the conditioning of the registry stage during a particular counting step, we have arranged to delay the receiver output for a selected period of time after the initiation of that counting step. This also overcomes the effect of transmission channel delays inherent in the transmission of carrier current pulses by allowing the receiver output to become conditioned to the new function state prior to registering the new value. In the form shown, a gating transistor is added in multiple with the final output transistor stage of each carrier receiver. In other words, the collector-emitter circuit of the gating transistor is connected in multiple with the collector-emitter circuit of the final amplifier stage transistor in the receiver. The conducting or nonconducting condition of the gating transistors is controlled over a supplemental pulse line, whose potential is such that these transistors are normally conducting and become nonconducting only during the reception of an interrogation pulse from this supplemental source. This pulse line thus operates in a manner similar to the counting pulse source except that each interrogating pulse is delayed for a selected period of time after the corresponding stepping pulse which drives the counting chain. These interrogating pulses thus control the receiver output, that is, the negative potential output, so that it occurs as a very short pulse of negative potential after the corresponding counting stage operation has occurred. Thus, during any selected counting step, the associated variable impedance network has been conditioned to allow the receiver output to be applied to the corresponding registry stage and, allowing for transmission delays, the receiver network has received the function carrier pulse assigned to that step before the receiver output pulse occurs. Thus all conditions are proper for registering, in the proper registry stage, the function received from the remote location.

We shall now describe two forms of registry circuit arrangements embodying our invention and shall then point out the novel features thereof in the appended claims.

Referring now to the drawings.

Figure 3:
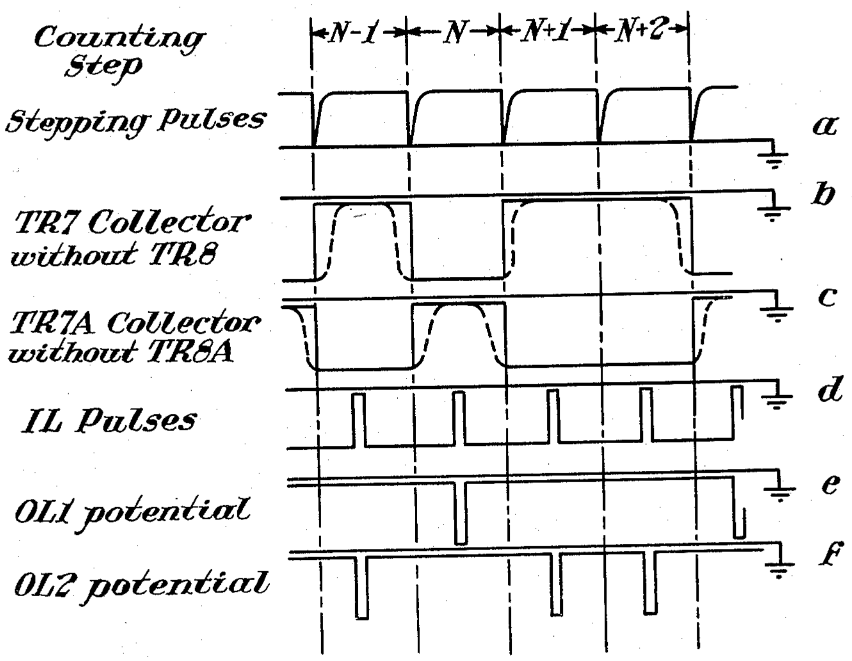

In Fig. 3, typical wave forms of the potentials at various points in the circuit arrangements embodying our invention are illustrated in a conventional manner.

Figure 1:
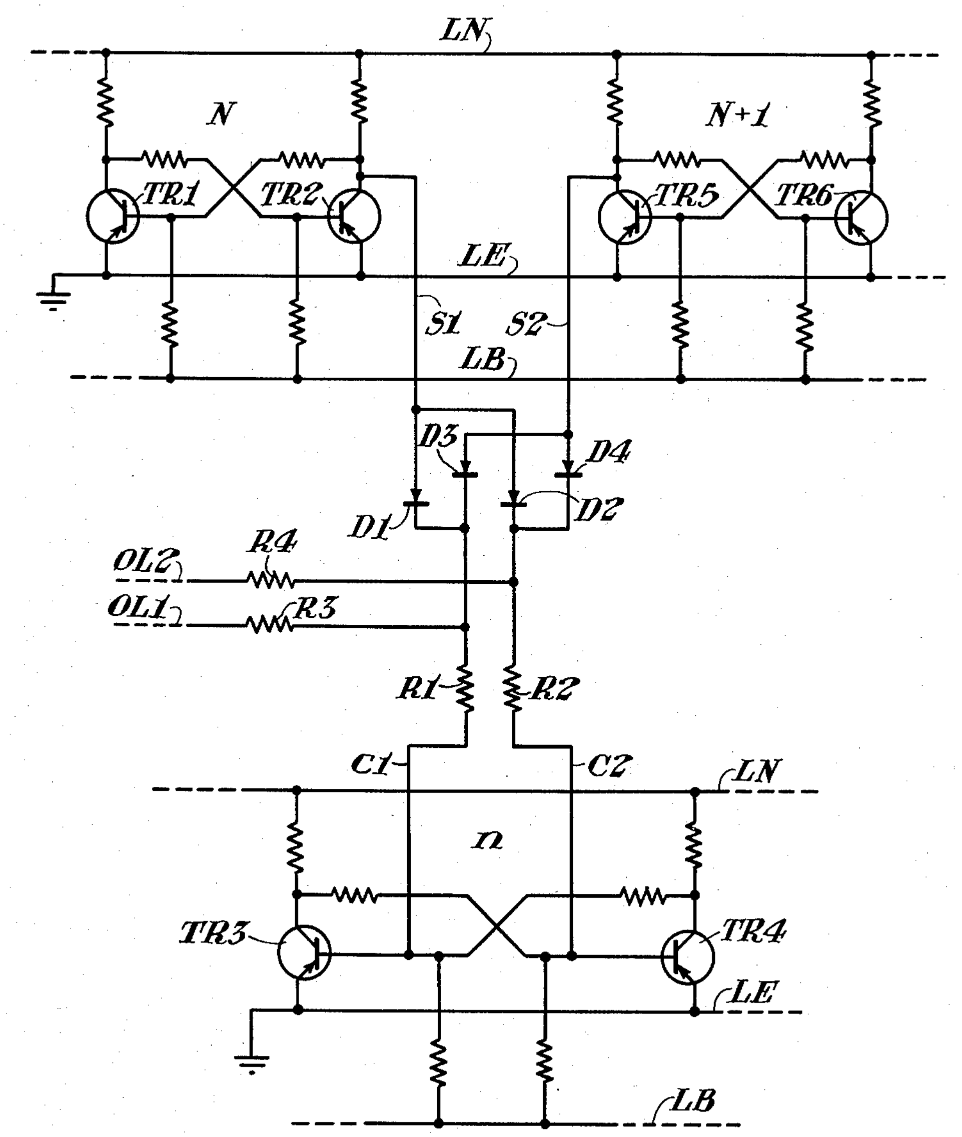
Fig. 1 illustrates a first form of counting and registry stage arrangements embodying our invention, showing two consecutive stages of the counting chain at a location in the remote control system and the registry stage, with the necessary connections thereto, associated with the first of the two counting stages.
Figure 4:
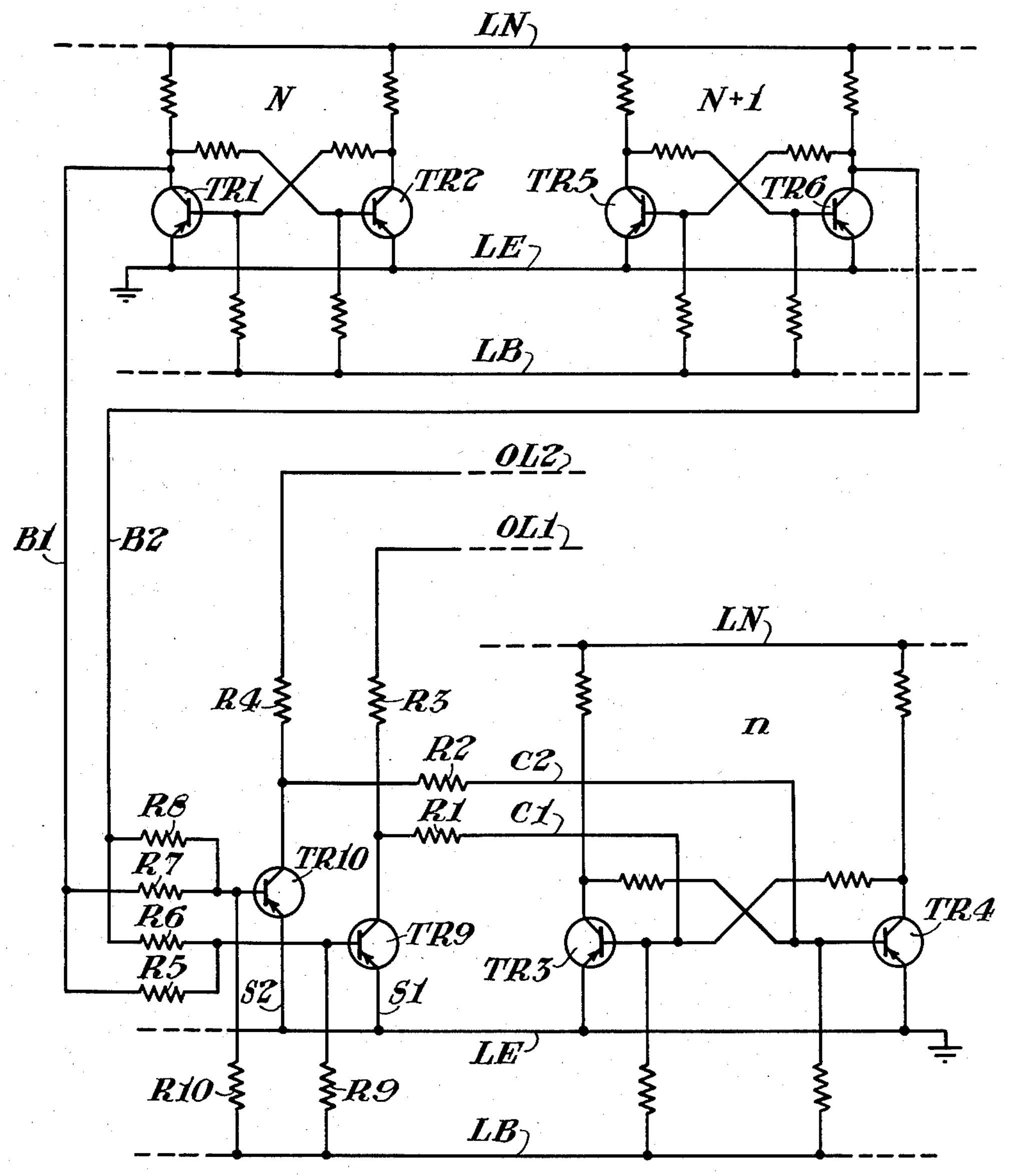

In Fig. 4, counting stage and registry stage circuits embodying a second form of our invention are illustrated as an alternate for the form shown in Fig. 1.

In all of the figures of the drawings, similar reference characters designate similar parts of the apparatus.

At each of the locations included in a remote control system incorporating the circuit arrangements embodying our invention, a source of direct current energy having sufficient voltage and capacity for the proper operation of the transistors and other apparatus is provided. This source may be a battery of proper size and capacity for this purpose. However, in order to simplify the drawings, the specific source is not shown. Where such potentials are required, a positive, a negative, and an intermediate or ground (zero) connection to this source of energy are illustrated as bus wires designated by the reference characters LB, LN, and LE, respectively. All of the transistors conventionally shown in the drawings are considered to be of the p-n-p junction type, but it is obvious that transistors of the n-p-n junction type could be used with proper modifications of the connections to the potential source. The various other conventional symbols used in the drawings are well known and need no further explanation.

Referring now to Fig. 1, at the top thereof is illustrated an adjacent pair of counting chain stages in the counting chain for this location of a remote control system. These two stages, designated N and $N+1$, operate, i.e., change condition, consecutively during each cycle of counting operation through the entire chain, the counting operation proceeding from stage N to stage $N+1$. At the bottom of Fig. 1 is a single registry stage $n$ which is associated with counting stage N. Each of these stages comprises two transistors of the p-n-p junction type, the counting stages including, respectively, transistors TR1 and TR2 and transistors TR5 and TR6 while the registry stage transistors are designated TR3 and TR4. The transistors of each stage are connected in the well known Eccles-Jordan circuit arrangement with the usual resistors connected to potential buses and in cross connection to provide bistable operation of the circuit. The potentials for proper operation are obtained from the previously mentioned buses LB, LN, and LE. The collectors of each transistor are connected through a resistor to negative potential bus LN, while the emitters are directly connected to the ground potential or zero potential bus LE. The base of each transistor is biased by a connection through a resistor to positive potential bus LB. Obviously, if n-p-n type transistors are to be used, these potential bus connections must be modified accordingly to provide equivalent operation.

Stages N and $N+1$ are intended to illustrate stages which are part of a counting chain for a continuously scanning electronic remote control system. To avoid confusion and to simplify the explanation of the system of our invention, most of the details of the operation of the counting chain are omitted as not pertaining to the present disclosure. A similar counting chain, although with two Eccles-Jordan circuits for each stage, is disclosed in the system of the previously mentioned copending Grose and Hurst application Ser. No. 710,718. Our present invention, of course, allows the elimination of the second E.-J. circuit from each counting stage. In the present discussion, it is assumed that, under normal conditions, the even numbered transistors of each circuit are conducting, that is, transistors TR2 and TR6 in the stages shown. Of necessity, the odd numbered transistors such as TR1 and TR5 are nonconducting under these conditions. Stepping pulses which cause each stage in turn to change over from the one stable conducting condition to its second stable conducting condition may be applied to the chain in any manner to cause such consecutive stepping action. Such stepping control is not here shown, being nonrelevant to the present disclosure. The stepping control may be a modification of that shown in the Grose and Hurst application or may be as shown for the single circuit scanning chains shown in the copending application for Letters Patent of the United States, Ser. No. 800,775, filed March 20, 1959, by E. I. White for Remote Control Systems. Described briefly, the stepping control successively causes each circuit to change over, by the application of a stepping pulse thereto, to the condition in which the odd numbered transistor is conducting and, of necessity, the even numbered transistor nonconducting. The interval between the change over, in this manner, of counting stages N and $N+1$ provides a step period which is also referred to as a counting step or a scanning step. The actual stepping pulse application and arrangement may be by any known method, the reference to the prior applications being by way of example only, for ready reference if desired.

The transmission of function controls from the location which includes stages N and $N+1$ of Fig. 1 is not shown, also being considered to be nonrelevant to our invention. However, if desired, reference may be had to the Grose and Hurst application for a showing of such function transmission by carrier current. Since the first E.-J. circuit of each counting chain stage is used in the Grose and Hurst system for the transmission of the function controls, the single circuit stages of our system entail no change in the transmisison control. In addition, registry stage *n* shown in Fig. 1 may also be modified as shown in Fig. 7 of the Grose and Hurst application to include a function stick relay. However, this modification does not change the basic operation of the E.-J. circuit comprising transistors TR3 and TR4 and thus is not specifically shown here for simplification of the discussion.

Figure 2:
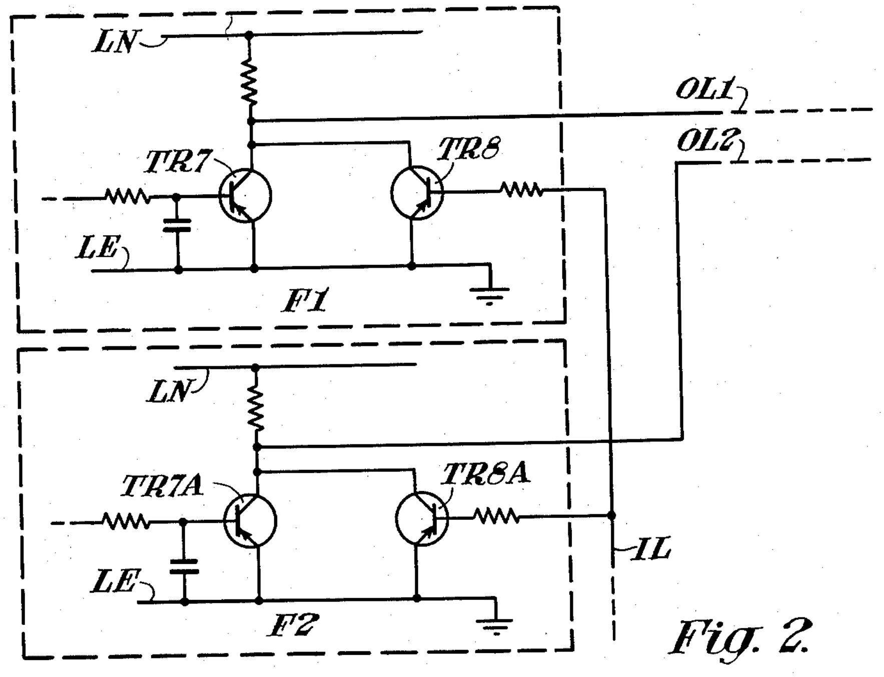
Fig. 2 illustrates a carrier receiver and delay network for all forms of our invention.

During each step period, a characteristic transmission is made from a remote location and is received by the receiver network illustrated in Fig. 2. As in the system of the Grose and Hurst application, there are actually two carrier receivers illustrated by the dot-dash-rectangles designated by references F1 and F2. Thus there is one receiver for each of the two carrier frequencies used in the function transmission. However, carrier current of only one of the two frequencies is transmitted during each step period, to designate one of the two possible states of the function. The complete circuits of the carrier receivers are not relevant to the present disclosure except for the modification added by our invention. In the transistorized system illustrated, any carrier receiver arrangement of the transistorized type can be used. Within the dot-dash rectangles F1 and F2, the final amplifier stage is shown including, respectively, transistors TR7 and TR7A. The collector-emitter circuit of each of these transistors is connected between negative potential bus LN and zero potential bus LE of the corresponding receiver. Each receiver has an output line connected to the collector of the final transistor and designated by the characters OL1 and OL2, respectively. It is assumed here that the final stage transistor is in its nonconducting condition when no carrier current input is received. Thus the collectors of transistors TR7 and TR7A under these conditions will have a negative potential approximately that of bus LN unless otherwise influenced by external connections.

In order to provide this external influence on the final stage transistor of the receiver, our invention adds the gating transistors TR8 and TR8A to receivers F1 and F2, respectively. The collector-emitter circuit path of each gating transistor is connected in multiple with that of the associated final stage transistor. The bases of transistors TR8 and TR8A are connected in multiple to an interrogating signal line IL, which is held normally at a negative potential. Pulses of zero potential are applied over line IL at the same frequency as the stepping pulses. In fact, the source of these interrogating or sampling pulses may be the same as that of the stepping pulses for the counting chain. However, some means must be provided to delay the interrogating pulses in time so that they occur a selected time interval after the corresponding stepping pulse and spaced between that stepping pulse and the successive one in the continuous cycle. The negative potential and the pulses over line IL may be provided in any well known manner, several methods being available which will satisfactorily provide the operation necessary for our invention. Thus the actual source of the interrogating pulses is not here shown in order to simplify the disclosure.

The normal negative potential over line IL obviously holds transistors TR8 and TR8A normally conducting. However, each zero potential pulse over tnis interrogating line causes these transistors to become, during the duration of that pulse, nonconducting. As long as transistor TR8, for example, is conducting, the collector of transistor TR7, connected in common with the collector of transistor TR8, is held at the ground or zero potential of bus LE, regardless of whether transistor TR7 is in a conducting or nonconducting condition. Said in another manner, even though transistor TR7 is itself in a nonconducting condition, its collector can only assume a negative potential when transistor TR8 is also in a nonconducting condition. Thus the output of receiver F1 over line OL1 is controlled by gating transistor TR8 to be a short pulse which occurs a selected time interval after the stepping pulse which initiates the step period during which a function may be received by receiver F1. In a similar manner, the output pulse of receiver F2 over line OL2 is controlled by transistor TR8A to occur, providing that transistor TR7A has become nonconducting, the selected time interval after the initiation of the corresponding step period or counting step during which the assigned function may be received over the transmission channel.

In Fig. 3, the relationship between the potentials at various points in the registry circuit arrangement of our invention is illustrated. Line *a* shows a group of zero potential stepping pulses which control the change over of counting stages to define a specific group of counting steps designated immediately above line *a* as being steps $N-1$ to $N+2$, respectively, in the operating cycle. These stepping pulses are shown as being from a single source but obviously the time element must be the same even though the counting chain is controlled from two stepping lines. Shown in lines *b* and *c* is an assumed wave form for the potential at the collectors of transistors TR7 and TR7A if gating transistors TR8 and TR8A were not used. In these two lines, the solid line is the theoretical wave form while the dotted line provides an approximation of the actual wave form at the collectors of these two transistors. Described in a bit more detail, the wave form in line *b* assumes that carrier current is received by receiver F1 during steps $N-1$, $N+1$, and $N+2$. Carrier current is received by carrier receiver F2 during counting step N. It is to be remembered that the final stage transistor in each of these carrier receivers is in its nonconducting condition, whether or not its collector actually assumes the negative potential of bus LN, when no carrier current of that frequency is being received. Line *d* shows an assumed wave form for the interrogating pulses received over line IL. Each of these zero potential pulses superimposed on the normally negative potential received over line IL causes an interruption of the conducting condition of gating transistors TR8 and TR8A. While transistors TR8 and TR8A are held conducting, output lines OL1 and OL2 are held at approximately zero potential as illustrated by the wave form in lines *e* and *f* of Fig. 3. During the period the gating transistors are cut off, a short negative pulse is permitted to pass over the output line associated with the receiver whose final stage transistor is at that time nonconducting due to the absence of carrier current of the corersponding frequency. Thus in wave forms *e* and *f*, a negative pulse occurs over line OL1 during counting step N while negative pulses occur in line OL2 during scanning steps $N-1$, $N+1$, and $N+2$. These output pulses are shown to be centered in the scanning step period but it is obvious that by shifting the interrogating pulse within the step period, the output pulses may likewise be shifted to allow for different propagation times in the transmission of the carrier current pulses from the remote location.

The receiver output lines OL1 and OL2 are connected in multiple to the input connections of each of the registry stages provided at this location. In Fig. 1, these input connections are designated by the reference characters C1 and C2 connected respectively to the bases of transistors TR3 and TR4 of registry stage *n*. In each of these input connections is interposed a resistor network between the output line and the bases of the corresponding transistors of the stage. In Fig. 1, series resistor network R1, R3 is interposed in connection C1 while resistors R2 and R4 are interposed in series in connection C2. Between counting stage N and the input connections C1 and C2 to stage $n$ is connected a shunt path S1. Specifically, shunt path S1 is connected between the collector of transistor TR2 and the intermediate points of the two resistor networks in the input connections. This shunt line includes in its two branches the half-wave rectifiers, or some other form of diodes, D1 and D2. A second shunt line S2 is connected between stage $N+1$, the next subsequent stage to stage N, and the same intermediate points in the resistor networks in the input connections C1 and C2. This shunt line S2 includes the half-wave rectifiers D3 and D4 and is specifically connected at its other end to the collector of the opposite transistor in stage $N+1$, that is, transistor TR5. Each of the half-wave rectifiers is poled with its low resistance direction being from the counting stages to the input connections.

With each counting chain stage shown in Fig. 1 in its normal condition, that is, prior to the period in the scanning cycle in which these stages change over to the opposite conducting condition, the collector of transistor TR2 is at zero potential since transistor TR2 is in its conducting condition. This zero potential so biases rectifiers D1 and D2 that shunt path S1 is open. It is to be noted that, at this time, with transistor TR5 nonconducting, the negative potential at its collector biases diodes D3 and D4 to be nonconducting so that the shunt path S2 is closed. Thus during this portion of the stepping cycle, half-wave rectifiers D1 and D2 are biased to provide for current flow through them in the low resistance direction while half-wave rectifiers D3 and D4 are oppositely biased so as to be nonconducting. Under these conditions, any receiver output in the form of negative pulses over lines OL1 and OL2 will be dissipated to ground bus LE through rectifiers D1 and D2 and transistor TR2. For example, the negative pulse in line OL2 during counting step $N-1$, as shown in Fig. 3, will be dissipated through rectifier D2 to ground. It will thus have no effect on transistor TR4 of registry stage $n$.

When counting stage N changes over to initiate the step period to which registry stage $n$ is assigned, transistor TR2 becomes nonconducting and its collector shifts to approximately the negative potential of line LN. Rectifiers D1 and D2 are now biased to their nonconducting condition and shunt paths S1 and S2 are both closed by negative bias, transistor TR5 remaining nonconducting at this time. Registry stage $n$ will now respond to the receiver output pulse over either line OL1 or OL2. As illustrated in Fig. 3, with the negative pulse appearing in line OL1, transistor TR3 becomes conducting. At the end of this relatively short negative pulse from the receiver output line OL1, registry stage $n$ remains in its stable condition with transistor TR3 conducting in spite of the zero potential now appearing on line OL1. This action is characteristic of the Eccles-Jordan circuit arrangement. When counting stage $N+1$ changes over to terminate step period N and initiate scanning step $N+1$, transistor TR5 becomes conducting so that its collector shifts to the zero potential of line LE. This biases rectifiers D3 and D4 into a conducting condition so that shunt path S2 is now open. Any output pulses from the receiver over lines OL1 and OL2 are now shunted to ground over path S2 and transistor TR5 and have no effect upon registry stage $n$. It is obvious that transistor TR5 remains conducting during the remainder of the scanning cycle so that stage $n$ holds its condition, to which it was driven during the proper scanning step, for the rest of the scanning cycle. It is also obvious that registry stage $n$, and in a similar manner all the other registry stages at this location, are responsive to the receiver output only from the beginning of the corresponding scanning step period to the beginning of the immediately following step period in the scanning cycle. Thus a function transmission received by the receiver network during a particular step period can only be recorded in the registry stage assigned to that step period. This operation is assured by the shunting network operation associated with the registry stage as shown in Fig. 1 and by the sampling action provided by interrogating pulses over line IL which occurs at a time interval following the begining of the proper step period to allow synchronizing of the action of the counting stage and the receiver network.

In the embodiment of our invention shown in Fig. 4, only the shunt paths S1 and S2 are changed from the form of Fig. 1. In Fig. 4, the collector-emitter circuit paths of transistors TR9 and TR10 are connected between the intermediate points of the resistor networks, in input connections C1 and C2, respectively, and ground bus LE. The bases of transistors TR9 and TR10 are connected to positive potential bus LB through biasing resistors R9 and R10, respectively. In addition, the base of transistor TR9 is connected through resistor R5 and biasing line B1 and resistor R6 and biasing line B2 to the collectors of transistors TR1 and TR6, respectively, in counting stages N and $N+1$. In other words, through the network, the base of transistor TR9 is connected to the collectors of oppositely located transistors in the consecutive counting stages N and $N+1$. The base of transistor TR10 is connected through resistors R7 and R8 and the aforementioned biasing lines to the same collector points. Under normal conditions, that is, prior to the change over of counting stage N in the counting cycle, transistor TR1 is nonconducting and its collector at approximately the negative potential of line LN. This negative potential over biasing line B1, being in excess of the positive potential supplied through resistors R9 and R10, holds transistors TR9 and TR10 conducting. Transistors TR9 and TR10 thus present low impedance paths to receiver output pulses over lines OL1 and OL2 and shunt them to ground away from the transistors of registry stage $n$. The output pulses are thus not effective to change the condition in this registry stage.

When counting stage N changes over to initiate the beginning of the step period to which registry stage $n$ is assigned, transistor TR1 becomes conducting so that its collector assumes the zero potential of line LE. The collector of transistor TR6 of stage $N+1$ is already at zero potential since this transistor is normally conducting. With the bias potential at the bases of transistors TR9 and TR10 thus shifted in the positive direction, these transistors become nonconducting, thus interrupting or blocking the shunt paths S1 and S2. The output pulse then received over line OL1 or OL2 is applied to the base of transistor TR3 or TR4 in registry stage $n$. In the example taken from Fig. 3, during step period N a negative pulse appears on line OL1 causing transistor TR3 to become conducting and the registry stage E.-J. circuit holds in this condition when the output pulse ceases. When counting stage $N+1$ changes over to end scanning step N, transistor TR6 becomes nonconducting. The negative potential then appearing at its collector is transmitted over biasing line B2 to cause transistors TR9 and TR10 to again become conducting to open shunt paths S1 and S2. The condition is now identical with that existing prior to scanning step N so that output pulses are shunted away from registry stage $n$ and are thus ineffective. Registry stage $n$ holds in its stable condition with transistor TR3 conducting in the present example. Thus, as in the first form described, only between the beginning of step period N and the beginning of the subsequent step period $N+1$ are both transistors TR9 and TR10 cut off to permit the receiver output pulse to be applied to the registry stage. The second form of our invention as shown in Fig. 4 becomes preferable to the form shown in Fig. 1 if the possibility of the failure of the half-wave rectifiers and the resultant interruption of the operation of the counting chain is highly objectionable for external operational reasons. It is otherwise obvious that the form shown in Fig. 1 is simpler and more economical in its use of apparatus.

The system of our invention, in its two embodiments shown and described and in others which are possible, thus provides various advantages and improvements over the systems of prior art. Only one Eccles-Jordan circuit is required for each stage of the single counting chain. In addition, the output of the receivers and the conditioning of the registry stages to record the receiver output is synchronized through the operation of the interrogating pulses. Only one registry stage is conditioned during each counting step to receive the function transmitted from the remote location at that time through the carrier channels. This assures proper registration of all functions assigned to the entire system. The single counting chain is simple in construction and more economical in its use of apparatus, thus effecting economies which are desirable in the installation of such systems.

Although we have herein shown and described but two forms of registry circuits for remote control systems embodying the features of our invention, it is to be understood that modifications and changes may be made therein within the scope of the appended claims without departing from the spirit and scope of our invention.

Having thus described our invention, what we claim is:

1. At a location in a remote control system, a multi-stage electronic counting chain in which the stages successively change condition in response to a stepping action to provide counting steps, means for receiving two-state information functions transmitted from a remote location to provide an output, a registry means associated with the first of a consecutive pair of counting stages and having a first and a second stable condition, said registry means being connected to said receiving means for registering the state of the function received by said receiving means during the counting step designated by the first stage of said pair, means also controlled by the stepping action and having connections for controlling the time of output of said function receiving means during each counting step, and variable impedance means controlled by said consecutive pair of stages for conditioning the connections of said receiving means to said registry means to cause the registry means to register the received function only during the counting step between the change of condition of the first and second stages of said consecutive pair.

2. At a location in a remote control system, a multi-stage electronic counting chain in which the stages successively change condition to define a series of counting step periods, means for receiving two-state information functions transmitted from a remote location, registry means having a first and a second stable condition associated with the first of a consecutive pair of counting stages and responsive to the output of said receiving means for registering the state of the function received during the counting step defined by the successive condition changes of said pair of stages, gating means also responsive to the stepping action driving said chain for effecting a timed output pulse from said function receiving means in accordance with the function state received during each counting step at a preselected time interval after the beginning of that step period, and variable impedance means controlled by said consecutive pair of stages for conditioning said registry means to respond to the output pulse from said receiving means to register the received function state only during the step period between the change of condition of the first and second stages of said consecutive pair.

3. In a remote control system, a counting chain having a plurality of stages connected in cascade and controlled to successively step from stage to stage during a cycle of operation, a registry stage for each counting stage for registering an assigned function received during the corresponding counting step, a function receiving means having output connections to said registry stages for applying an output during each step in accordance with the state of the received function, impedance means associated with each counting chain stage and having connections to the corresponding registry stage, each impedance means being responsive to the stepping action for effecting the registry of the assigned function received during that counting step only in the corresponding registry stage, and an output delay means responsive to the stepping control and having connections for delaying each output of said receiving means for a preselected period of time after the initiation of the corresponding counting step, thereby assuring that each registry stage is conditioned during its assigned step to record the received function and the assigned function has been received prior to the receiving means output.

4. At a station location in a remote control system, a multi-stage electronic counting chain and a stepping control therefor for successively changing the condition of the consecutive stages to define a series of counting steps, means for receiving two-state information functions transmitted from a remote location, a registry means for each counting chain stage having a first and second condition and connected to said receiving means for at times registering the state of a particular function received during the counting step defined by the associated counting stage, gating means also controlled by said stepping control for effecting an output pulse from said receiving means in accordance with the received function state at a preselected time period after the beginning of each counting step, and a variable impedance means for each counting stage controlled by that counting stage and the next subsequent stage for controlling the connections to the corresponding registry means from said receiving means to effect registry in that registry means of the function state received only during the corresponding counting step.

5. In combination, at a station in a remote control system, a pair of consecutive stages of a counting chain which successively change condition during a stepping operation, a function receiving means having a first and a second condition for receiving a two-state function transmitted from a remote location, a registry means associated with the first stage of the consecutive pair and having a first and a second stable condition for registering the first and second state respectively of the function assigned said first stage, a variable impedance means controlled by said pair of stages to a first condition prior to the change of condition of the first stage and after the change of condition of the second stage and to a second condition during the interval between the successive condition changes of the two stages, output means connected between said receiving means and said registry means and controlled by said impedance means in its second condition for registering the condition of the receiving means in said registry means only when said output means is in a preselected condition, and delay means for effecting a timed interval of said preselected condition of said output means a selected period of time after said first stage changes its condition.

6. In combination, at a station in a remote control system, a pair of consecutive stages of a counting chain which successively change condition to define a step period, a function receiving means having a first and a second output condition for receiving a two-state function transmitted from a remote location during said step period, a registry means having a first and a second stable condition for registering the first and second state respectively of said function, a variable impedance means controlled by said pair of stages to a low impedance prior to the change of condition of the first stage and after the change of condition of the second stage and to a high impedance during the interval between the successive condition changes of the two stages, a gating means and a control therefor for effecting a pretimed open gate interval a selected period of time after said first stage changes its condition, and circuit means connecting said receiving means and said registry means and controlled by said impedance means and said gating means for transferring the output condition of said receiving means to said registry means only when said impedance means has high impedance and the gate is open.

7. At a station location in a remote control system including a cascade connected counting chain with a plurality of stages and a stepping means therefor to effect cyclic operation of said stages to define a series of consecutive step periods, function registry apparatus for recording two-state information functions received from a remote location one during each step period, comprising, a bistable registry circuit for each counting stage, a function receiver network for receiving the functions and supplying a first or a second output pulse according as the first and second state of each function is received, a first and a second output circuit connecting said function receiver network to each registry circuit to energize during each step period a selected registry circuit by said first and said second pulses into its first or second stable condition respectively, a variable impedance circuit for each counting stage also connected to the corresponding registry circuit, each impedance circuit being biased jointly by the associated stage and the next subsequent counting stage to normally provide a low impedance to shunt said output pulses from the corresponding registry circuit and to provide a high impedance to interrupt the shunt only during the step period defined by operation of the associated stage, and a gating pulse supply connected to said function receiver network for limiting each output pulse to occur a preselected time interval after the initiation of the corresponding step period.

8. At a station location in a remote control system including a cascade connected counting chain with a plurality of stages and a stepping means therefor to effect cyclic operation of said stages to define a series of consecutive step periods, function registry apparatus for recording two-state information functions received from a remote location one during each step period, comprising, a bistable registry circuit for each counting stage, a function receiver network for receiving the functions and supplying a first or a second output pulse according as the first and second state of each function is received, a first and a second output circuit connecting said function receiver network to each registry circuit to energize during each step period a selected registry circuit by said first and said second pulses into its first or second stable condition respectively, a shunt path including impedance elements connected to each registry circuit, the impedance elements of each shunt path being normally biased to a low impedance jointly by the associated counting stage and the next subsequent counting stage to render said output pulses ineffective to energize the corresponding registry circuit and to a high impedance only during the step period defined by the operation of the associated counting stage to interrupt the shunt path and render the output pulses effective to energize the corresponding registry circuit, and a gating pulse supply connected to said function receiver network for limiting each output pulse to occur a preselected time interval after the initiation of the corresponding step period.

9. At a station location in a remote control system including a cascade connected counting chain having a plurality of stages and a stepping supply therefor to effect cyclic operation of said stages to define a series of consecutive step periods, function registry apparatus for recording two-state information functions received from a remote location one during each step period, comprising, a bistable registry circuit for each counting stage, a function receiver means for supplying a first and a second output pulse according as the first or second state respectively of a function is received, a source of sampling pulses for supplying one pulse intermediate the beginning and end of each step period, a first and a second output circuit connecting said receiver means to each registry circuit to energize a selected registry circuit during each step period by said first and said second output pulses into its first or second stable condition respectively, a gating means connected to said receiver means and controlled by said source of sampling pulses for opening a circuit gate to effect transmission of an output pulse over said output circuits only during the duration of a sampling pulse, a variable impedance circuit for each counting stage also connected to the corresponding registry circuit each impedance circuit being biased jointly by the associated counting stage and the next subsequent counting stage to normally provide a low impedance to shunt said output pulses away from the corresponding registry circuit, said impedance circuit being biased jointly by the pair of consecutive counting stages to a high impedance to interrupt the shunt only during the step period defined by operation of the associated stage, thereby assuring registry of each output pulse in the correct corresponding registry circuit while that circuit is conditioned for registering.

10. At a station location in a remote control system including a cascade connected counting chain having a plurality of stages and a stepping supply therefor to effect cyclic operation of said stages to define a series of consecutive step periods, function registry apparatus for recording two-state information functions received from a remote location one during each step period, comprising, a bistable registry circuit for each counting stage, a first and a second function receiver each having a final output transistor a different one of which is conducting for each state of a received function, first and second output connections to connect the output of said first and said second final transistor respectively to said registry circuits to energize one circuit into one of its stable conditions in accordance with the nonconducting transistor, a gating transistor for each receiver with its conducting path connected in multiple with that of the corresponding final transistor to render that transistor ineffective to energize said registry circuits while said gating transistors are conducting, an interrogation pulse source for supplying one pulse during each step period a preselected time interval after the beginning of the step period, said pulse source being connected to render said gating transistors nonconducting for the duration of each interrogating pulse, each gating transistor in its nonconducting condition cooperating with the corresponding final transistor in its nonconducting condition to transmit an energizing pulse over the corresponding output connection, a shunt path including impedance elements connected to each registry circuit, the impedance elements of each shunt path being normally biased to a low impedance jointly by the associated counting stage and the next subsequent counting stage to render said output pulses ineffective to energize the corresponding registry circuit and to a high impedance only during the step period defined by the operation of the associated counting stage to interrupt the shunt path and render the output pulses effective to energize the corresponding registry circuit, thereby assuring registry of each received function only in the correct registry circuit while that circuit is conditioned for registering.

11. At a station location in a remote control system including a cascade connected counting chain having a plurality of stages and a stepping supply therefor to effect cyclic operation of said stages to define a series of consecutive step periods, function registry apparatus for recording two-state information functions received from a remote location one during each step period, comprising, a bistable registry circuit for each counting stage, a function receiver means for supplying a first and a second output pulse according as the first or second state respectively of a function is received, a source of sampling pulses for supplying one pulse intermediate the beginning and end of each step period, a first and a second output circuit connecting said receiver means to each registry circuit to energize a selected registry circuit during each step period by said first and said second output pulses into its first or second stable condition respectively, a gating means connected to said receiver means and controlled by said source of sampling pulses for opening a circuit gate to effect transmission of an output pulse over said output circuits only during the duration of a sampling pulse, a shunt network connected to each registry circuit, each shunt path including half-wave rectifiers poled to normally shunt said output pulses away from the associated registry circuit and render them ineffective, said rectifiers being jointly biased by the associated counting stage and the next subsequent counting stage so as to block the shunt path and render the output pulses effective to energize the corresponding registry circuit only during the step period defined by the associated counting stage.

12. At a station location in a remote control system including a cascade connected counting chain having a plurality of stages and a stepping supply therefor to effect cyclic operation of said stages to define a series of consecutive step periods, function registry apparatus for recording two-state information functions received from a remote location one during each step period, comprising, a bistable registry circuit for each counting stage, a function receiver means for supplying a first and a second output pulse according as the first or second state respectively of a function is received, a source of sampling pulses for supplying one pulse intermediate the beginning and end of each step period, a first and a second output circuit connecting said receiver means to each registry circuit to energize a selected registry circuit during each step period by said first and said second output pulses into its first or second stable condition respectively, a gating means connected to said receiver means and controlled by said source of sampling pulses for opening a circuit gate to effect transmission of an output pulse over said output circuits only during the duration of a sampling pulse, a shunt network for each registry circuit comprising emitter-collector paths of a pair of like transistors one for each output circuit connected to shunt said output pulses away from the associated registry circuit when the transistors are in their conducting condition, biasing connections for each shunt network so connected to the corresponding counting stage and to the next subsequent counting stage to normally maintain the transistors in conducting condition and to bias the transistors to become nonconducting only during the step period defined by the operation of said corresponding counting stage.

13. At a station location in a remote control system including a cascade connected counting chain having a plurality of stages and a stepping supply therefor to effect cyclic operation of said stages to define a series of consecutive step periods, function registry apparatus for recording two-state information functions received from a remote location one during each step period, comprising, a bistable registry circuit for each counting stage, a function receiver means for supplying a first and a second output pulse according as the first or second state respectively of a function is received, a source of sampling pulses for supplying one pulse intermediate the beginning and end of each step period, a first and a second output circuit connecting said receiver means to each registry circuit to energize a selected registry circuit during each step period by said first and said second output pulses into its first or second stable condition respectively, a gating means connected to said receiver means and controlled by said source of sampling pulses for opening a circuit gate to effect transmission of an output pulse over said output circuits only during the duration of a sampling pulse, a shunting network for each registry circuit comprising a first and a second path, said first path being connected between the associated registry circuit and the corresponding counting stage and including half-wave rectifiers poled to normally shunt said output pulses away from said associated registry circuit to render them ineffective to energize that circuit and biased by said corresponding counting stage to interrupt said first shunt path when said corresponding counting stage operates to initiate the corresponding step period, said second path being connected between the associated registry circuit and the next subsequent counting stage in the operation cycle, said second path including other half-wave rectifiers poled to shunt said output pulses away from said associated registry circuit after said subsequent stage has initiated the subsequent step period in the operation cycle and normally biased by said subsequent stage to interrupt said second shunt path, each shunting network thereby rendering the output pulses effective to energize the associated registry circuit only during the step period defined by the corresponding counting stage.

No references cited.